J. VERDERBER.
AUTOMOBILE HEATING AND COOLING APPARATUS.
APPLICATION FILED MAR. 20, 1916.

1,213,305.

Patented Jan. 23, 1917.

Inventor
Josef Verderber
by Thurston & Kwis
Attorneys

UNITED STATES PATENT OFFICE.

JOSEF VERDERBER, OF CLEVELAND, OHIO.

AUTOMOBILE HEATING AND COOLING APPARATUS.

1,213,305.      Specification of Letters Patent.      Patented Jan. 23, 1917.

Application filed March 20, 1916. Serial No. 85,229.

*To all whom it may concern:*

Be it known that I, JOSEF VERDERBER, a citizen of the United States, residing at Cleveland, in the county of Cuyahoga and State of Ohio, have invented a certain new and useful Improvement in Automobile Heating and Cooling Apparatus, of which the following is a full, clear, and exact description.

This invention relates to an apparatus for heating and cooling an automobile.

I am aware that numerous forms of apparatus have been proposed for accomplishing this result, but most of them are expensive and many are inefficient in their operation.

It is the object of this invention to produce an apparatus for the purpose which will give maximum efficiency and at the same time will be low in cost of production.

Generally speaking, the invention may be said to comprise the elements and combinations thereof set forth in the accompanying claims.

Reference should be had to the accompaying drawings forming a part of this specification, in which—

Figure 1:
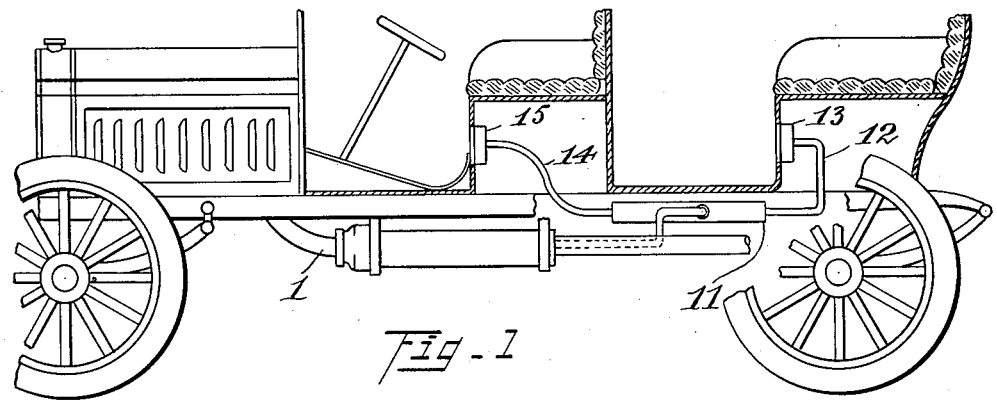
Figure 2:
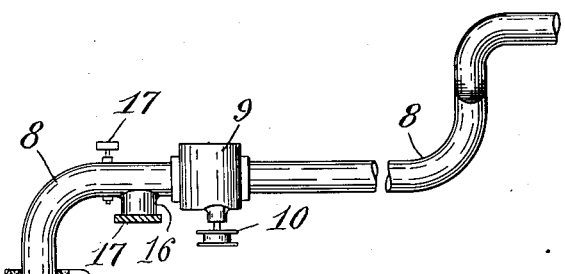
Figure 3:
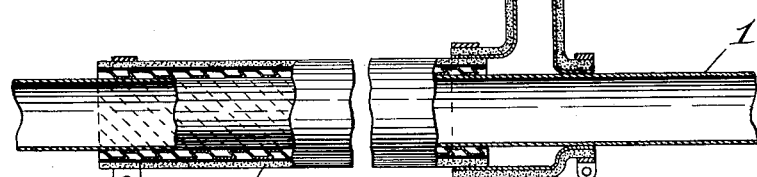
Figure 3:
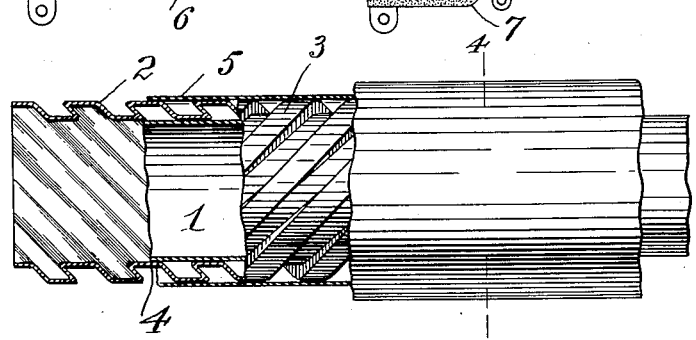
Figure 4:
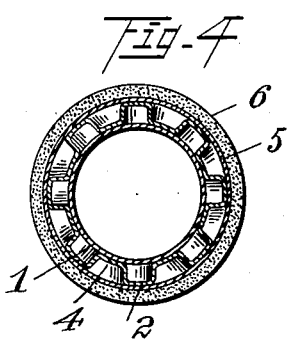

Figure 1 is a side elevation with portions in section of an automobile showing the manner in which the heating apparatus of my invention may be employed; Fig. 2 is a top plan view with portions in section of part of the apparatus; Fig. 3 is an elevation with portions in section showing a part of the heating apparatus; and Fig. 4 is a transverse sectional elevation on line 4—4 of Fig. 3.

The apparatus for carrying out my invention is adapted to utilize the heat of the products of combustion as they pass from the engine to the muffler. All automobiles are provided with a pipe for conducting the exploded gases in the manner described, and such a pipe is shown in the drawings at 1. The muffler is not shown. Surrounding the pipe 1 there is a cylindrical member generally represented at 2, which member is formed from a piece of sheet metal and is rolled or otherwise formed so as to provide a series of spiral extensions, such as indicated at 3. The metal forming the bottoms of the grooves 4 between the extensions 3 will lie in contact with the pipe 1 and the heat of the gases passing through the pipe 1 will be communicated through the walls of this pipe and to the metal forming the bottoms of the groove 4, and the heat thus imparted will be distributed throughout the metal forming the member 2. Upon the outside of the member 2 there is a plain cylindrical metal tube 5 and upon the outside of the metal tube 5 there is a layer of heat retaining material 6 such as asbestos or any other well known form. The construction just described forms a heat absorbing and retaining means. At one end of this heat absorbing and retaining means there is what may be termed a header 7 which is formed of metal or similar material and engages the end of the heat retaining and absorbing means and also engages with the pipe 1. This member 7 is adapted to conduct heated air which may be drawn through the heat absorbing and retaining member and to conduct it to a pipe 8. In this pipe 8 there is a fan or any form of suction device which is not shown but which is described as being within the casing 9. This fan or suction device may be driven by a pulley 10, which pulley may be driven from any rotating part of the engine or from any source of motive power connected with an automobile. The suction producing device here shown is only illustrative and I consider it within my invention to use any other device which will produce a suction in the system.

The pipe 8 extends to a manifold 11 and from the manifold there leads a pipe 12 to a heater 13 which is carried in the front upright forming the rear seat of the automobile. There is also a pipe 14 which proceeds from the manifold 11 and connects with the radiator 15 carried in the upright forming the front portion of the forward seat of the vehicle. Obviously, the positions of the radiators 13 and 14 may be arbitrarily chosen, and the particular showing here made forms no limitation in this respect.

The operation of the suction device will cause a positive flow of air through the spiral passages and to the radiators in the automobile.

A portion of the apparatus may be used as a cooling device for the summer time, and in order to draw cool air and deliver it through the radiators 13 and 15, I provide a passageway 16 which normally is closed by a cover 17. There is also a butterfly valve in the pipe 8 between the connection 15 and the heat absorbing and retaining device, the handle of such valve being represented at 17. If the handle 17 be turned to close the valve and the cover 16 be removed, the suction device will draw cool air and force it through the pipe 8 and out through the radiators 13 and 15.

Having thus described my invention, what I claim is:—

1. A heat absorbing apparatus for automobiles comprising an elongated casing adapted to fit over the pipe conducting the exhaust gases from the engine of the automobile, a member having a spiral passageway formed therein contacting with said exhaust pipe, heat retaining means surrounding the said member having the spiral passageway, a chambered member with which the spiral passageway communicates and means for conducting heated air to suitable radiators.

2. A heat absorbing apparatus for automobiles, comprising an elongated casing adapted to fit upon the pipe conducting the exhaust gases from the engine of the automobile, a member having a plurality of unconnected spiral passageways formed therein contacting with the said exhaust pipe, heat retaining means surrounding the said member having spiral passageways, a chambered member with which the spiral passageways communicate, and means for conducting the heated air to suitable radiators.

3. A heat absorbing apparatus for automobile heating purposes comprising an elongated casing adapted to fit upon the pipe conducting the exhaust gases from the engine of the automobile, a member having inwardly extending projections adapted to contact with said pipe said projections forming walls for spiral grooves in said member, means surrounding the said member having spiral passageways, a chambered member with which the spiral passageways communicate, and means for conducting the heated air to suitable radiators.

4. A heating apparatus for automobiles, comprising an elongated casing adapted to surround a portion of the pipe conducting exhaust gases from the engine, a sheet metal member having a plurality of raised spiral passageways formed therein and adapted to surround the said pipe for the exhaust gases, heat retaining material forming the outside cover for the said member having the spiral passages, a chambered member with which the spiral passages communicate, a pipe communicating with the chambered member for conducting the heated air, and a suction device for drawing air through the casing and chambered member.

5. A heating apparatus for use with an automobile, comprising an elongated casing adapted to encircle a portion of the pipe which conducts the gases from the engine, said casing comprising an inner member having spiral grooves formed therein, the bottom of the grooves contacting with the outer surface of the said pipe, a cylindrical member surrounding the said member having the spiral grooves formed therein, and a cover of heat retaining material surrounding the said cylindrical member, a chambered member covered with heat insulating material, which chambered member surrounds a portion of the pipe from the engine and likewise communicates with the spiral passageway before mentioned, a pipe communicating with the chambered member, and a suction device associated with said pipe to draw air through the spiral passageways and the said chambered member.

6. An apparatus for use with an automobile, comprising an elongated casing adapted to fit upon the pipe conducting the exhaust gases from the engine of the automobile, a member having spiral passageways formed therein contacting with the said exhaust pipe, heat retaining means surrounding the said member having spiral passageways, a pipe for conducting heated air from said member, a suction device connected with the said pipe, a valve in said pipe and an opening having a removable cover in said pipe whereby the passage of air through said member may be shut off and air drawn through said opening in the pipe.

In testimony whereof, I hereunto affix my signature.

JOSEF VERDERBER.